United States Patent [19]

Hingorani

[11] Patent Number: 5,041,164
[45] Date of Patent: Aug. 20, 1991

[54] APPARATUS FOR WASHING ELECTRICAL INSULATORS

[75] Inventor: Narain G. Hingorani, Los Altos Hills, Calif.

[73] Assignee: Electric Power Research Institute, Palo Alto, Calif.

[21] Appl. No.: 216,304

[22] Filed: Jul. 7, 1988

[51] Int. Cl.$^5$ .............................................. B08B 3/02
[52] U.S. Cl. .............................. 134/22.12; 134/22.14; 134/22.17; 134/22.18; 134/55; 134/88; 134/175; 134/176; 174/154; 174/158 R; 239/104
[58] Field of Search ............ 134/172, 183, 199, 22.11, 134/22.12, 25.1, 35, 183, 36, 122, 175, 188, 200, 22.14, 22.17, 22.18, 55, 88, 76; 174/154, 157, 158 R, 163 R; 184/15.1; 239/104

[56] References Cited

U.S. PATENT DOCUMENTS

| | | | |
|---|---|---|---|
| Re. 29,493 | 12/1977 | Crump | 184/15.1 |
| 2,858,555 | 11/1958 | Medovick | 174/154 |
| 3,074,649 | 1/1963 | Atkinson | 239/165 |
| 3,606,172 | 9/1971 | Kazuyuki et al. | 174/154 |
| 3,783,972 | 1/1974 | Molstad | 184/15.1 |
| 3,916,925 | 11/1975 | Crump | 134/172 |
| 4,039,048 | 8/1977 | Safholm | 184/15 |
| 4,063,617 | 12/1977 | Shenk | 184/15.1 |
| 4,169,427 | 10/1979 | Crump et al. | 184/15.1 |

FOREIGN PATENT DOCUMENTS 59-85968  3/1967  Japan .................................. 134/198

*Primary Examiner*—Anthony McFarlane
*Attorney, Agent, or Firm*—Henry K. Woodward

[57] ABSTRACT

Apparatus for washing the disc portions of an electrical insulator includes first and second mating housing portions for positioning about the discs and fluid lines for delivering a cleansing fluid through the housing portions for cleaning the surface of the discs. The two mating housing portions preferably define a basin for collecting the cleansing fluid and facilitating removal of the cleansing fluid after use. A support assembly including a robotic arm positions the first and second mating housing portions about the discs of the electrical insulator for cleaning. A cleaning liquid such as water or freon or a cleaning gas such as air or steam is applied through the mating housing portions for cleaning the surface of the discs. Following the cleaning, a surface-enhancing material such as a silicone coating can be applied to the surface of the insulator for protection from future contamination and make the insulator more resistant to electrical or mechanical degradation.

8 Claims, 2 Drawing Sheets

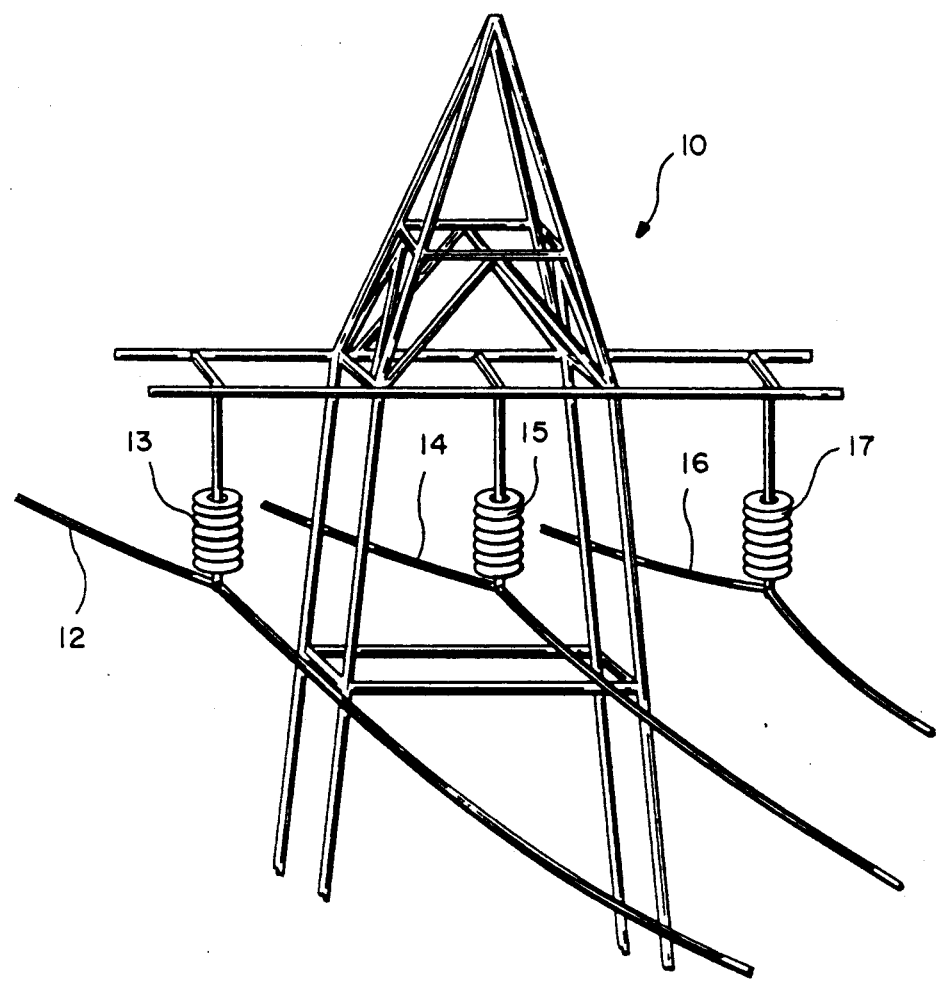
FIG.—1
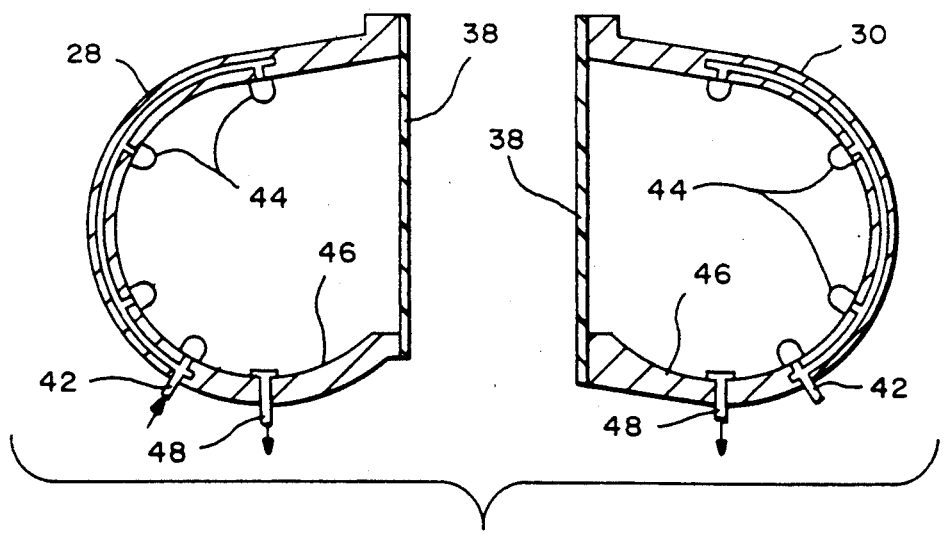
FIG.—3

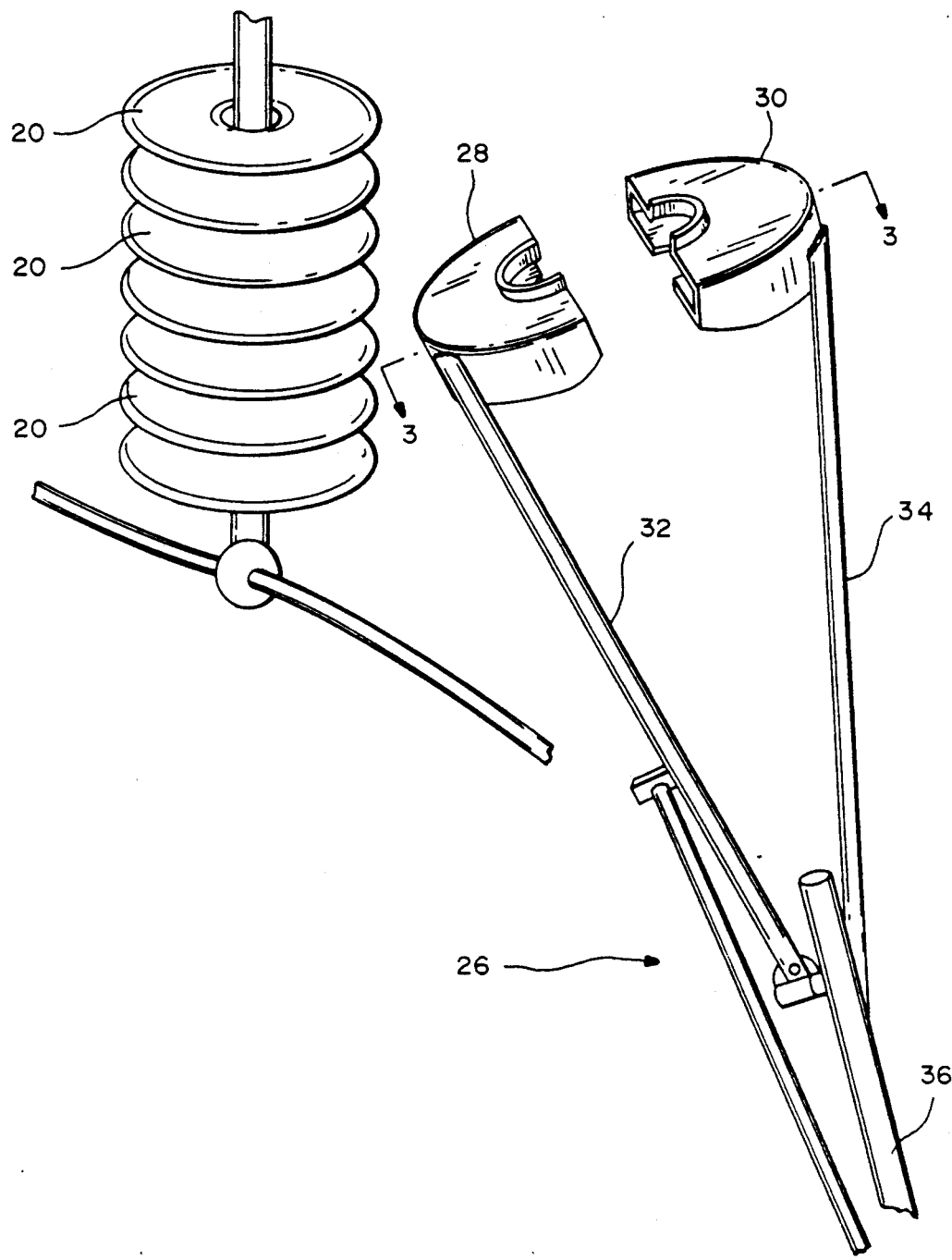
FIG.—2

APPARATUS FOR WASHING ELECTRICAL INSULATORS

BACKGROUND OF THE INVENTION

This invention relates generally to electric power transmission and distribution networks, and more particularly the invention relates to apparatus for washing electrical insulators in such networks.

Powerlines for the transmission of electric power are supported by electrical insulators from support towers. Similar electrical insulators are used with transformers in power transmission and distribution substations.

Such insulators typically comprise a plurality of serially-connected or stacked ceramic discs. The undulating surfaces of the discs increase the outer surface from the grounded support tower to the energized line, thus increasing the impedance of the insulator. Each disc also provides some rain protection for the discs thereunder.

Contaminants such as dirt and salt can build up on the insulator surfaces. When exposed to the moisture from dew, frost, or light rain, the dampened contaminants can conduct current and lead to an electrical failure, or flashover, of the insulator. Most insulator designs depend on wind and rain to clean the insulator surfaces, but, when the natural cleaning is insufficient, other methods are required to clean the insulators. Further, it is highly desirable and often imperative that this cleaning be done while the equipment or line is energized. Additionally, the cleaning must be accomplished without causing an electrical flashover and preferably without contaminating nearby areas with the cleansing material.

SUMMARY OF THE INVENTION

An object of the present invention is an improved apparatus for cleaning electrical insulators.

Another object of the invention is an apparatus for washing electrical insulators in an electrical system while the system is energized.

Still another object of the invention is insulator washing apparatus in which a cleansing fluid is substantially captured or diverted to a harmless path after use.

A feature of the invention is apparatus having two mating half-sections which can be placed around one or more insulator discs and enclose the discs during a washing operation.

In operation, after the two mating half-sections enclose the insulator discs, a cleansing fluid is sprayed or blown under pressure onto the insulator surface. The fluid can be a liquid such as water, freon, or perchloroethyelene or a gas such as compressed air. An abrasive can be transported by the fluid to facilitate the cleansing action.

In a preferred embodiment, the two mating half-sections define a receiving basin for collecting the cleansing material which is then drained by gravity or suction into a reservoir for reuse or for disposal without contaminating the environment.

The cleaning apparatus can be placed on the insulator by an insulated mechanical arm that closes the two half-sections around the insulator discs, cleans the insulator, and then moves the apparatus to the next insulator discs until the entire insulator assembly is cleaned. After cleaning of the insulator assembly, a protective coating can be applied to the surface of the insulator to discourage future contamination and increase the insulator resistance to electrical or mechanical degradation.

The invention and objects and features thereof will be more readily apparent from the following detailed description and the appended claims when taken with the drawing.

BRIEF DESCRIPTION OF THE DRAWING

FIG. 1 is a perspective view of a portion of an electric power transmission line supported by insulators from a support tower.

FIG. 2 is a perspective view of a portion of the electrical insulator of FIG. 1 and cleaning apparatus in accordance with one embodiment of the invention.

FIG. 3 is a section view of the cleaning apparatus of FIG. 2.

DETAILED DESCRIPTION OF ILLUSTRATIVE EMBODIMENTS

Referring now to the drawing, FIG. 1 is a perspective view of a portion of an electric power transmission line including a tower 10 which supports a three-phase power line 12, 14, 16 from electrical insulators 13, 15, 17, respectively. The electrical insulators typically comprise a plurality of serially-connected or stacked ceramic discs with the undulating surfaces of the discs increasing the outer surface from the grounded support tower to the energized lines, thus increasing the surface impedance of the insulator.

As noted above, when natural cleaning of the insulators by means of wind and rain is insufficient to remove contaminants from the surfaces of the insulators, operators of the electric power transmission system must clean the insulators. Further, it is highly desirable and often imperative that the cleaning of the insulators be accomplished while the power line is energized.

FIG. 2 is a perspective view of an insulator including discs and cleaning apparatus shown generally at 26 for cleaning one or more discs in accordance with one embodiment of the invention. The apparatus 26 includes two mating housing half-sections 28 and 30 which are supported by brackets 32 and 34 attached to a robotic arm 36. Hydraulic means (not shown) associated with the robotic arm 36 controls the opening and closing of the half-sections 28, 30 for placement around the discs 20 22, 24 for cleaning operation. Once the two half-sections are placed around and enclose a disc or discs, a cleaning fluid is applied through the half-sections to cleanse the outer surface of the insulator discs.

FIG. 3 is a section view through the housing half-sections 28, 30 of FIG. 2. Seals 38 on each half-section facilitate a fluid-tight seal when the two sections are engaged around the insulator discs. Each half-section of the cleaning apparatus includes an inlet line 42 for applying a cleansing fluid through the body of the half-sections and through nozzles 44 for spraying on the surface of the enclosed insulator. Each half-section is configured to define a reservoir portion 46 for capturing the cleansing fluid, and a line 48 removes the cleansing fluid from the reservoir for recycling or for disposal without contaminating the environment. The recaptured cleansing fluid can be removed by gravity flow or by suction. Each half-section of the cleaning apparatus is preferably formed of a molded ceramic with the cleansing fluid lines 42 embedded therein.

The cleansing fluid can be a liquid such as water, freon, or a detergent, or a high-pressure gas. The recovered cleansing material can be filtered or otherwise reclaimed for reuse in a closed-cycle operation. Alternatively, the collected cleansing material can be discarded. Following the cleansing operation, a surface enhancing material such as silicone coating can be applied to the insulator to protect the insulator from future contamination or cause the surface to be hydrophobic or otherwise make the insulator more resistant to electrical or mechanical degradation.

The cleaning apparatus in accordance with the invention can be applied to a wide variety of electrical insulators including transmission line insulators of the suspension type or post type, substation insulators, distribution line insulators, and bushing type insulators.

Cleaning only one disc at a time on an energized line assures that excessive insulation length is not bridged and that adequate margin is maintained. If it is determined that adequate margin is available, or if the line or equipment is not energized, multiple discs can be cleaned at one time. If a multiple disc mating assembly is used, the catch basin must be in the bottom-most part of the assembly.

While the invention has been described with reference to a specific embodiment, the description is illustrative of the invention and is not to be constructed as limiting the invention. Various modifications and applications may occur to those skilled in the art without departing from the true spirit and scope of the invention as defined by the appended claims.

I claim:

1. Apparatus for washing disc portions of a electrical insulator in an energized electrical system comprising:
   first and second mating housing portions for positioning about at least one disc portion,
   means for delivering a cleansing fluid through said housing portions for cleaning the surface of the at least one disc portion,
   means for collecting said cleansing fluid after cleaning said surface, and
   means including a robotic arm for supporting and actuating said housing portions for positioning about at least one disc portion.

2. The apparatus as defined by claim 1 wherein said first and second mating housing portions define a basin for collecting cleansing fluid and facilitating removal of the cleansing fluid after use.

3. The apparatus as defined by claim 2 and further including drain means communicating with said basin for removing collected cleansing fluid.

4. The apparatus as defined by claim 3 wherein said drain means includes a suction line and a collection reservoir.

5. The apparatus as defined by claim 3 wherein said drain means includes gravity feed line.

6. The apparatus as defined by claim 1 wherein said first and second mating housing portions include sealant surfaces which engage to form a fluid-tight seal.

7. A method of cleaning electrical insulators in an energized electrical system comprising the steps of
   a) positioning a housing around a portion of the insulator using a robotic arm,
   b) applying a cleansing fluid through said housing to the surface of the portion of the insulator, and
   c) collecting said cleansing fluid.

8. The method as defined by claim 7 including providing said housing with a collection basin for the cleansing fluid and providing a drain line from said basin for removal of said cleansing fluid.

* * * * *